US006965395B1

(12) United States Patent
Neter

(10) Patent No.: US 6,965,395 B1
(45) Date of Patent: Nov. 15, 2005

(54) METHODS AND SYSTEMS FOR DETECTING DEFECTIVE IMAGING PIXELS AND PIXEL VALUES

(75) Inventor: Sarit Neter, Irvine, CA (US)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 965 days.

(21) Appl. No.: 09/659,355

(22) Filed: Sep. 12, 2000

(51) Int. Cl.[7] .............................. H04N 7/18; H04N 9/47; H04N 9/64
(52) U.S. Cl. .................... 348/129; 348/134; 348/246; 348/247
(58) Field of Search ............................ 348/129, 134, 348/246, 247

(56) References Cited

U.S. PATENT DOCUMENTS

| 4,176,373 A | | 11/1979 | Dillon et al. |
| 4,245,241 A | | 1/1981 | Sato et al. |
| 4,300,163 A | | 11/1981 | Wada et al. |
| 4,774,565 A | | 9/1988 | Freeman |
| 4,805,023 A | | 2/1989 | Younse et al. |
| 5,329,312 A | | 7/1994 | Boisvert et al. |
| 5,541,654 A | | 7/1996 | Roberts |
| 5,640,202 A | | 6/1997 | Kondo et al. |
| 5,805,216 A | * | 9/1998 | Tabei et al. ................. 348/246 |
| 5,841,126 A | | 11/1998 | Fossum et al. |
| 5,995,675 A | * | 11/1999 | Hwang ....................... 382/268 |
| 6,069,351 A | | 5/2000 | Mack |
| 6,166,367 A | | 12/2000 | Cho |
| 6,618,084 B1 | * | 9/2003 | Rambaldi et al. ........... 348/247 |
| 6,642,960 B1 | * | 11/2003 | Kohashi et al. ............. 348/246 |
| 6,665,009 B1 | * | 12/2003 | Dong .......................... 348/246 |
| 6,683,643 B1 | * | 1/2004 | Takayama et al. .......... 348/247 |
| 6,724,945 B1 | * | 4/2004 | Yen et al. .................... 382/274 |

FOREIGN PATENT DOCUMENTS

JP 08261512 10/1996

OTHER PUBLICATIONS

Sano et al., "Submicron Spaced Lens Array Process Technology for a High Photosensitivity CCD Image Sensor", IEEE Electron Devices Meeting, Technical Digest, Dec. 1990. pp. 11.5.1-11.5.4.
Zhimin Zhou, et al., "Frame-Transfer CMOS Active Pixel Sensor With Pixel Binning", IEEE Transaction on Electron Devices, Oct. 1997, vol. 44, No. 10, pp. 1764-1786.

* cited by examiner

Primary Examiner—Wendy R. Garber
Assistant Examiner—James M. Hannett
(74) Attorney, Agent, or Firm—George O. Saile; Stephen B. Ackerman; Billy Knowles

(57) ABSTRACT

The present invention is related to methods and systems for detecting defective imaging array pixels and providing correction, thereby reducing or eliminating visible image artifacts. One embodiment of the present invention provides an on-line bad pixel detection and correction process that compares a first pixel readout value with a first value related to the readout values of other pixels in first pixel's local neighborhood. When the first pixel readout value varies by more than a first amount as compared with the first value, a second value related to the readout values of the neighboring pixels is used in place of the first pixel readout value.

39 Claims, 8 Drawing Sheets

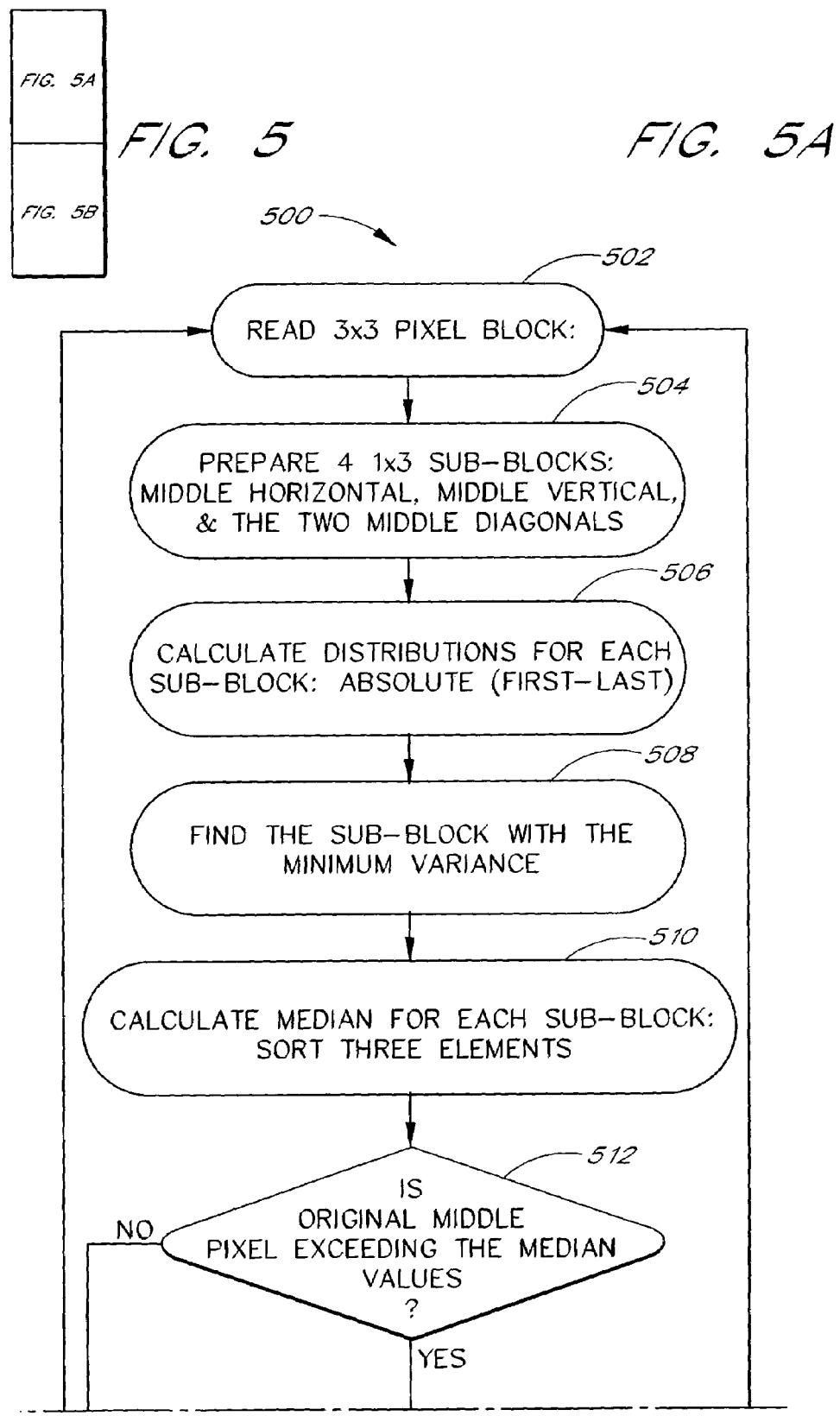

METHODS AND SYSTEMS FOR DETECTING DEFECTIVE IMAGING PIXELS AND PIXEL VALUES

CLAIM OF PRIORITY

This patent application claims the benefit of U.S. Provisional Application No. 60/149,796 filed Aug. 19, 1999, and U.S. application Ser. Nos. 09/495,971, 09/496,364, 09/496,533, 09/496,607, filed Feb. 2, 2000, which are hereby incorporated herein by reference in their entirety.

BACKGROUND OF THE INVENTION

1. Field of the Invention

The present invention relates to imaging devices and, more particularly, to methods and systems for compensating for defective pixels and pixel values.

2. Description of the Related Art

Conventional integrated circuit imaging devices include an array of light detecting elements or pixels which are interconnected to generate an analog signal representation of an image illuminating the device. Two common examples of conventional integrated circuit imaging devices are a charge coupled device (CCD) and a complementary metal oxide semiconductor (CMOS) image sensing device. Conventional imaging devices typically include one or more light detecting elements and charge storage elements. Such integrated circuits employ a light detecting element, such as a photodiode or phototransistor, that is capable of conducting current approximately proportional to the intensity of the light illuminating the element and a charge storage element. The collection of the signals from the pixels represents the image of the scene viewed by the array.

In order to produce a color image, the imaging devices separate the light into various color components by filtering the light before the light strikes the light detecting elements. The array of light detecting elements is often deposited with a filter layer such that neighboring pixels may have different color filters and organized in a particular pattern.

Because each pixel is typically only capable of detecting a single color, conventional imaging devices utilize a process by which all of the color components are reconstructed for each pixel in order to maintain the original unfiltered array resolution. To reconstruct the color components, conventional imaging devices use a process of color interpolation that is performed after an analog signal associated with each pixel has been digitized. The conventional process of color interpolation performed after an analog signal associated with each pixel has been digitized requires conversion from analog to digital (A/D) and may require extensive computations in order to achieve a high quality color presentation of the image. The A/D conversion and extensive computations may require hardware, such as analog-to-digital (A/D) converters, memory, processors and software. The hardware and software may add to the complexity, size and expense of the imaging device and reduce the speed of the imaging process.

Each pixel represents a sample of the scene and hence is a data value in the two-dimension image produced by the imaging system. Defective pixels, commonly referred to as 'bad pixels,' are caused by an array defect and do not provide the correct light intensity value. Bad pixels appear as image artifacts that can reduce the image quality significantly. In particular, a bad pixel produces an output signal that significantly deviates from the mean output level of adjacent pixels when the exposure level of all pixels is unified. Pixels that are significantly brighter than adjacent pixels in a unified dark frame are commonly referred to as a 'hot pixels,' while pixels that are significantly darker than adjacent pixel in a unified bright frame are commonly referred to as 'dead pixels.'

The defective pixels are typically distributed in a random manner. However, a 'bad column' (i.e., a complete column is defective) or a blemish (i.e., a cluster of neighboring pixels is defective) may occur and are typically discarded by the manufacturer. Sensor arrays that contain random defective pixels in an amount that does not exceed a given limit are released, and the remaining bad pixels are sometimes be corrected in some other manner.

Some CCD and CMOS integrated circuit color imaging devices employ a process of bad pixel detection and correction. Conventionally, the bad pixel detection step is performed off-line by the manufacturer, before the imaging device is shipped. A bad pixel list is typically stored in an EEPROM lookup table. When the imaging device is later used in a product, such a camera, the lookup table is read to locate the bad pixels. Once the bad pixel locations are read, the values of the bad pixels are discarded when constructing an image based upon the imaging device readout. The bad pixel correction is performed by substituting the bad pixel value with the value of a pre-specified other pixel, wherein a lookup table created during the manufacturing process is used to identify the pre-specified other pixel whose value is to be used. This conventional correction step is typically performed after the analog signal for each pixel has been digitized.

The conventional bad pixel detection and correction process described has several significant drawbacks. For example, some of the array defects that cause bad pixels are temperature and gain dependent, and thus may appear and disappear during operation. Because these bad pixels are not consistently "bad," they may not be detected by the manufacturer, and hence, may not be corrected. In addition, because the detection step is performed off-line by the manufacturer, a non-volatile storage device is needed to store the defect pixel list. Adding a storage unit disadvantageously increases the cost and complexity of the system.

SUMMARY OF THE INVENTION

The present invention relates to methods and systems for the detection of defective pixels within an array of sensor cells and for correction or compensating for the defective pixels. The effect these defective pixels have on image quality is thereby reduced. In particular, one embodiment of the integrated circuit imaging system of the present invention includes an on-line, on the fly defective pixel detection and correction process that provides high speed operation, reduced storage requirements, and improved detection of defective pixels as compared to conventional systems.

For example, one embodiment of the present invention provides an on-line bad pixel detection and correction process that compares a first pixel readout value with the readout values of other pixels in first pixel's local neighborhood. The average, weighted mean or median value of the readout values of the other pixels may be calculated. The calculated value may also include the first pixel readout value. This calculated value may be used in the comparison with the first pixel readout value. When the first pixel readout value varies by more than a first amount as compared with the value calculated based on the readout values of the neighboring pixels, a value related to the readout values of the neighboring pixels is used in place of the first pixel readout value.

One significant advantage of the present invention is that the correction or compensation for some or all bad pixels may be performed, including bad pixels and bad pixel values that are introduced during the real-time operation of the imaging system due to temperature and/or gain changes. Thus, bad pixels and bad pixel values may be detected while the imaging device is used on-line by a consumer or other end-user, such as in a camera or the like. By contrast, conventional techniques only correct bad pixels that were identified during the manufacturing process, before the imaging device is delivered to the end-user.

Another significant advantage of the present system is that it prevents the loss of edges in a reconstructed image. Conventional processes may destroy edges via the correction process since often times the correction involves a low pass filter that reduces the high frequency content of the reconstructed image.

Still another advantage of the present system is that, because the present invention corrects bad pixels on-line, the need for bad pixel look up tables is reduced or eliminated. Thus, the cost and complexity associated with non-volatile storage units conventional used to store bad pixel lookup tables, such as those used by conventional systems is reduced or eliminated. Also, the system is advantageously able to correct individual bad pixels distributed randomly in an array, rather than solely a cluster or column of bad pixels.

In one embodiment, the imaging system includes an array of pixel sensor cells arranged in rows and columns, a plurality of detection circuits, and an array controller with a programmable readout mode. The system may comprise a monochrome or a color imaging system. If the imaging system is a color imaging system, then a color filter layer comprised of several color filter components organized in a predefined pattern may be deposited on or otherwise placed over the pixel sensor array. For example, in one embodiment, the color filter comprises a primary color system with red, green, and blue filters (RGB) or a complementary color system arranged in a Bayer pattern.

In one embodiment, the imaging system may further include amplification stages, analog-to-digital conversion units, memory units and various other signal processing blocks either 'on-chip,' that is, on the same chip as the imaging device, such as on the same chip as a CMOS integrated circuit imaging device, or 'off-chip,' that is on a separate chip or circuit board than the imaging device.

The imaging system may be a monochrome imaging system employing a CMOS integrated circuit, or may be color imaging system employed, by way of example, a CCD imaging device with appropriate color filters. In one embodiment, a signal processing circuit is used to detect and correct defective or bad pixels. The signal processing circuit treats bad pixels as random shot noise and utilizes non-linear conditional filtering for detecting and eliminating or excluding the bad or noisy pixels.

In one embodiment, the color imaging system employs an on-the-fly bad pixel detection and correction process using a signal processing procedure performed during readout of the imaging device output signals, while those signals are still in analog form. This on-the-fly bad pixel detection and correction process is capable of random access readout and includes programmable gain amplifiers, an A/D converter, one or more registers for temporary storage, and a signal processing block. In this on-the-fly mode of operation, the signal processing unit performs the detection step via horizontal, vertical and diagonal conditional median filters. If the pixel whose value is being examined, which may be the middle or center pixel within a horizontal, vertical or diagonal set of pixels, the is not within the condition limits, its value is replaced in the correction step. The replacement value may be determined by the directional median that possesses the minimum variation. The value chosen can be, by way of example, a median, weighted mean, or average value of two or more pixels in the neighborhood in which the bad pixel is situated.

In one embodiment, the imaging system uses random access readout. However the imaging system may also use a pipeline architecture, a parallel readout architecture, or other architectures. A pipeline architecture may use a sequential readout via row and column shift registers and several line storage units, such as random access memory (RAM) in digital domain or capacitors in analog domain. In a parallel readout architecture, several pixels per column can be read simultaneously via independent column buses and stored in registers.

In still other embodiments, the imaging system further combines the on-the-fly bad pixel detection & correction with various readout modes such as windowing and sub-sampling. In one embodiment, the imaging system uses additional signal processing such as on-the-fly color interpolation.

The pixels of the imaging system are not required to be organized in a rectangular matrix. A similar implementation can provide on-the-fly bad pixel correction and detection for color imaging system and/or different pixel topography via modification to the readout control, the pixel neighborhood size and configuration. For example, a color imaging system with an RGB Bayer pattern may use a 5×5 pixel neighborhood out of which pixels of the same color component as the pixel who value is being examined are selected for the filtering process.

BRIEF DESCRIPTION OF THE DRAWINGS

FIGS. 5A–B illustrate one embodiment of an on-the-fly bad pixel detection and correction process implemented by the circuit of FIG. 4.

DETAILED DESCRIPTION OF PREFERRED EMBODIMENTS

Figure 1:
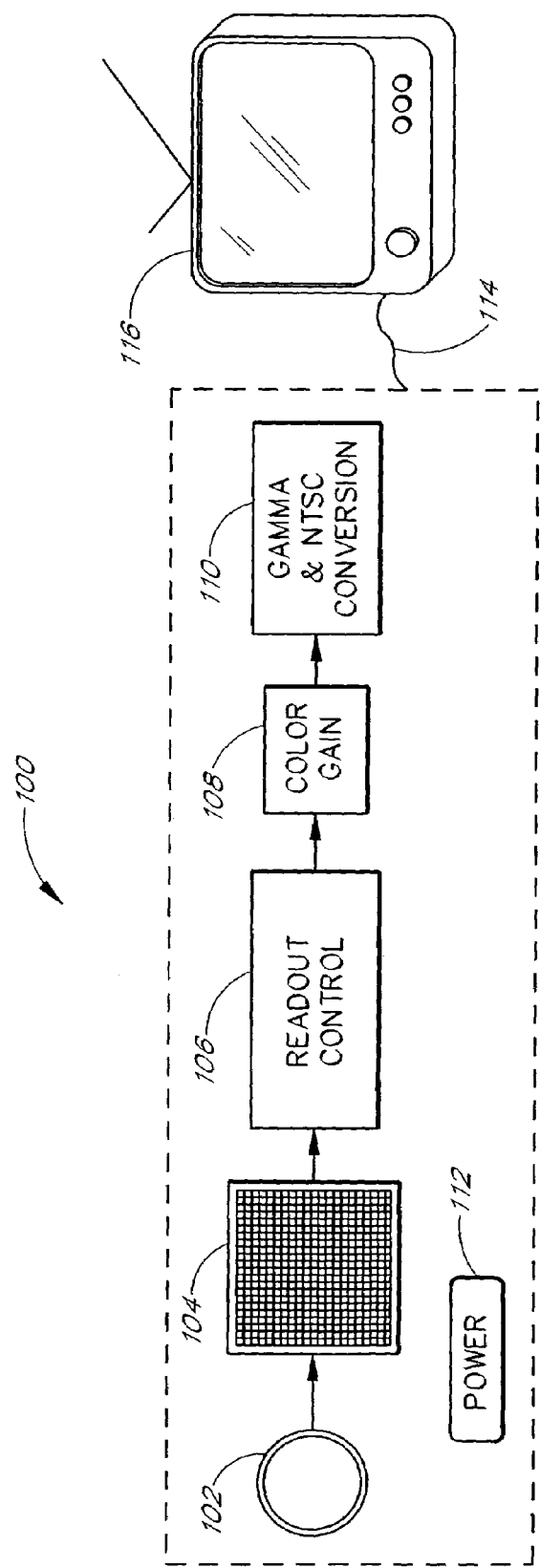
FIG. 1 illustrates one embodiment of an imaging system coupled to a television.

The present invention relates to a novel imaging system that provides flexible addressing and processing of imaging pixel sensor elements. The novel architecture of the present invention allows for a highly integrated, low cost imager with high speed performance and good image quality. Defective or bad pixels within an array of active or passive pixel sensor cells are detected and compensated for, thereby reducing or eliminating the visible effects the bad pixels may have on resulting images. In one embodiment, the imaging system provides an on-line, on-the-fly bad pixel detection and correction process that provides high speed operation, reduced non-volatile storage requirements, and good performance.

For example, one embodiment of the present invention provides an on-line bad pixel detection and correction process and circuit that compares a first pixel readout value with another value derived at least in part on the readout values of other pixels in first pixel's local neighborhood. Based on this comparison, a determination is made as to whether the first pixel readout value is valid. If it is determined that the first pixel readout is not valid, a value related to the readout values of the neighboring pixels is used in place of the first pixel readout value, and is sent downstream as part of the image data to be stored, processed, displayed and/or printed. Otherwise, the first pixel readout value may be used. The term pixel value, as used herein, may be an analog or digital readout value, a digitized version of the analog readout value, or other transformed pixel readout value.

The exemplifying imaging systems described below use a monochrome CMOS integrated circuit, an array of pixels organized in a rectangular matrix, and, in a color version, a color filter with a primary color system (RGB) in a Bayer color pattern. However, other embodiments use a charge coupled device (CCD) or may use other imaging technologies. Likewise, the imaging systems of the present invention may be implemented with another color system, such as the complimentary color system (Yellow, Cyan and Magenta) and/or another color pattern. In addition, the imaging system of the present invention may be implemented with the pixels organized in another pixel matrix or pixel topography. For example, the array does not have to be rectangular or have a regular pattern of pixels.

The imaging system may also include either on-chip or off-chip amplification stages, analog-to-digital conversion units, memory units and various other signal processing blocks. In addition, the system may further comprise a micro-lenses layer. For example, in one embodiment, the bad pixel detection and correction system resides with a CMOS sensor array on the same chip or substrate, such as in a CMOS integrated circuit color imaging device. In another embodiment, the bad pixel detection and correction system resides in a separate companion chip and is used in conjunction with a CCD sensor array located on a separate substrate.

Figure 2:
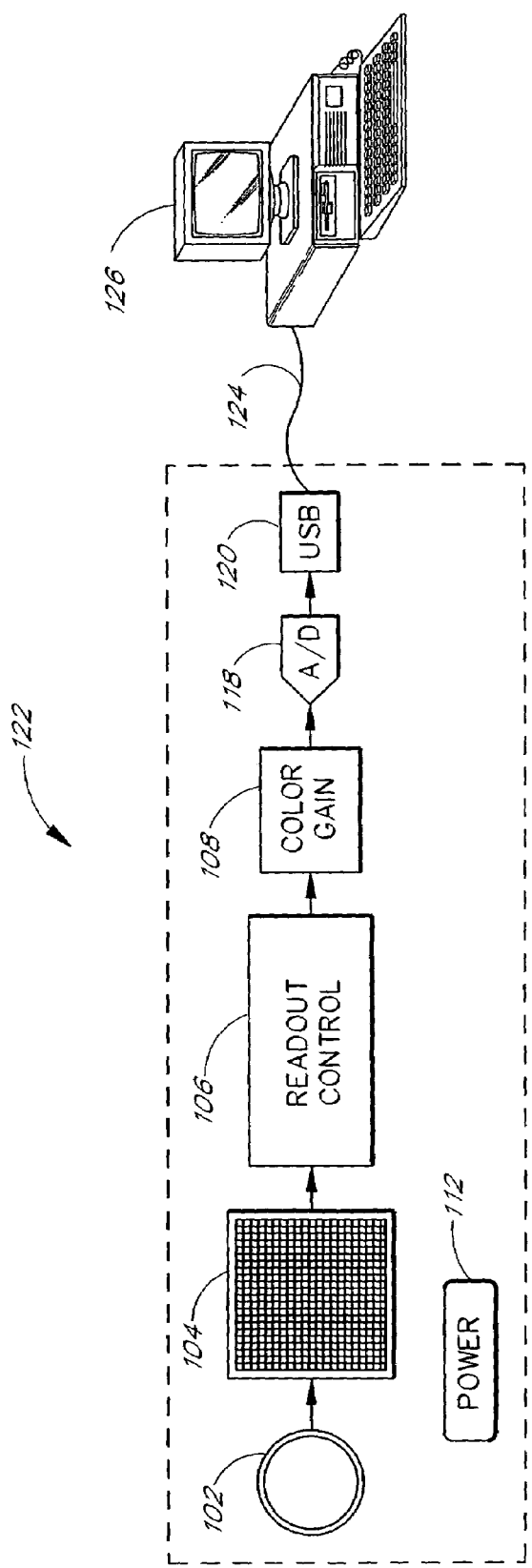
FIG. 2 illustrates one embodiment of an imaging system coupled to a computer.

FIGS. 1 and 2 illustrate exemplifying systems incorporating embodiments of the novel imaging system 100, 122. FIG. 1 illustrates one embodiment of an imaging system 100 coupled to a television 116 via a coax cable 114. The exemplifying system 100 includes a lens 102, a sensor array 104 which may include one or more color filters, a readout control 106, gain amplifiers 108 for each color, an NTSC encoder 110 including gamma correction and a power supply 112 used to power the camera circuitry and sensor array 104. The lens 102 may be used to focus images onto the sensor array 104, and/or may be used as a protective covering for the sensor array 104. In one embodiment, the imaging system 100 is a video camera. In other embodiments, the imaging system 100 may be implemented in security cameras, digital cameras, camcorders, video telephones and the like.

FIG. 2 illustrates one embodiment of an imaging system 122 coupled to a computer 126 via a universal serial bus (USB) cable 124. The exemplifying system 122 includes a lens 102, a sensor array 104 which may include one or more color filters, a readout control 106, gain amplifiers 108 for each color, an analog to digital converter 118, a USB interface 120 and a power supply 112 used to power the imaging system circuitry and sensor array 104. In one embodiment, the imaging system 122 is a video camera. In other embodiments, the imaging system 122 may be similarly implemented in security cameras, digital cameras, camcorders, video telephones and the like.

Figure 3:
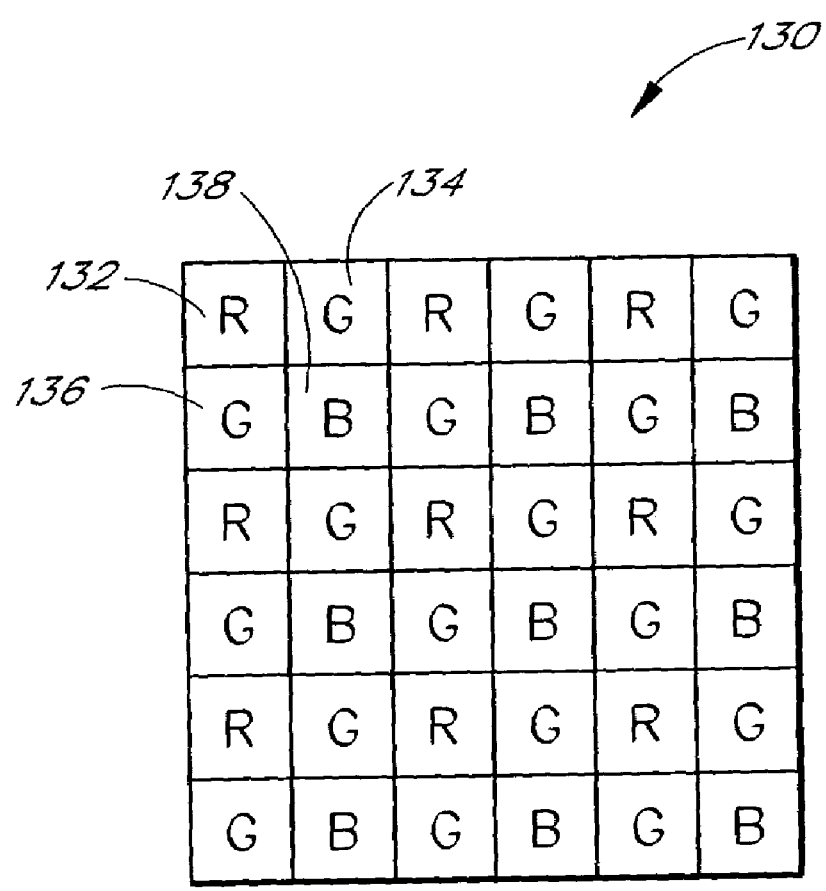
FIG. 3 illustrates a Bayer pattern color filter for the primary color system.

FIG. 3 illustrates a conventional Red, Green and Blue (primary color system) Bayer color pattern 130 for a color filter that is deposited on an array of pixel cells that detect light. The pattern core is a group of 2 by 2 pixels that contains 2 green components 134, 136, one red component 132 and one blue component 138. The 2 green components 134, 136 are diagonal neighbors, and the red and the blue components 132, 138 are diagonal neighbors. Thus, the green resolution of the array is reduced by a ratio of 2:1 horizontally only, while the red and the blue resolution is reduced by a ratio of 2:1 horizontally and vertically. The pattern 130 exploits the fact that the human eye perceives intensity edges better than color edges and that the green component contains the highest amount of intensity information.

Figure 4:
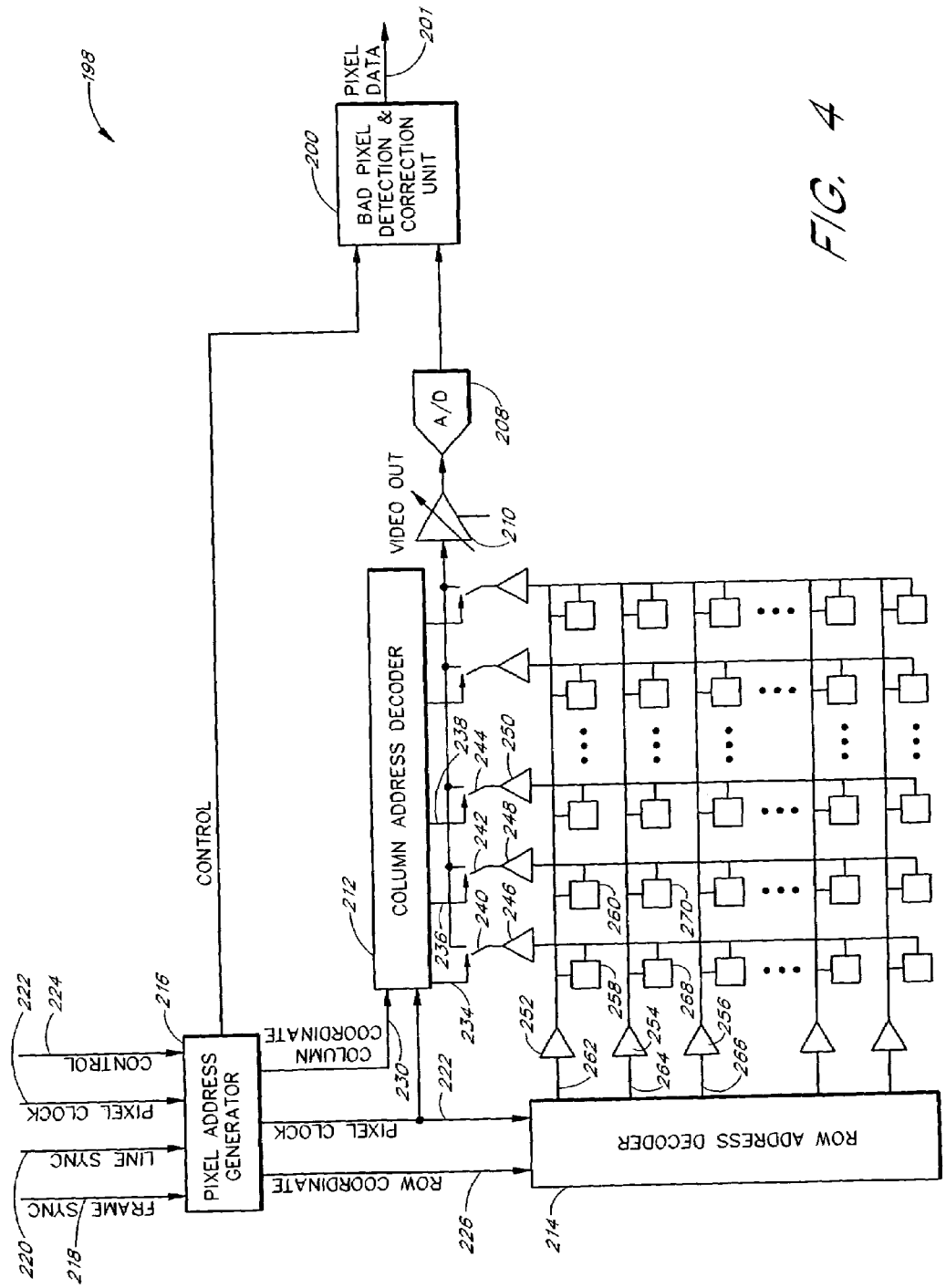
FIG. 4 illustrates one embodiment of a CMOS integrated circuit, monochrome imaging system that supports on-the-fly bad pixel detection & correction.

FIG. 4 illustrates one embodiment of a circuit which utilizes the novel bad pixel detection and correction technique of the present invention. The illustrated embodiment is a CMOS integrated circuit, monochrome imaging system 198 that supports on-the-fly bad pixel detection & correction via programmable pixel readout circuitry 212, 214 and signal processing circuitry 200, 208. Other embodiments may employ CCD integrated circuit and/or different color filters. The signal processing unit may be analog or digital. The signal processing unit may be implemented using dedicated hardwired circuitry, a general purpose processor that may also perform other tasks, or a programmable circuit, such as a DSP, optimized for signal processing functions.

As illustrated in FIG. 4, the system 198 includes a bad pixel detection and correction unit 200, a pixel data output line 201, an analog-to-digital (A/D) converter 208, an analog amplifier 210, a column address decoder 212, a row address decoder 214, a pixel address generator 216, a row coordinate line 226, a column coordinate line 230, a frame synchronization signal 218, a line synchronization signal 220, a pixel clock signal 222, a control signal 224, a first column readout line 234, a second column readout line 236, a third column readout line 238, a first switch 240, a first column buffer 246, a second switch 242, a second column buffer 248, a third column readout line 238, a third switch 244, a third column buffer 250, a first row readout line 262, a second row readout line 264, a third row readout line 266, a first row buffer 252, a second row buffer 254, a third row buffer 256, a first pixel 258, a second pixel 260, a third pixel 266, a fourth pixel 268, and an optional storage unit 232. In one embodiment, the amplifier 210 is a programmable gain amplifier.

FIG. 4 presents an implementation for monochrome on-the-fly bad pixel detection & correction when windowing and sub-sampling is not active. The present invention, however, is not limited to a monochrome imager. Nor is the present invention limited in its mode of operation and can be realized to support window and sub-sampling via the programmable readout control circuitry 212, 214. In the description herein, a "programmable" component refers to a component that responds to a command from an end-user of the imaging system or to a command issued by internal firmware according to firmware stored in the imaging system. For example, if an end-user chooses a 'zoom' function or a 'preview' function on a video camera containing the imaging system of the present invention, the imaging system directs the programmable components to act in a predefined manner according to firmware stored in the imaging system.

In FIG. 4, the system 198 contains a signal processing unit 200 that allows bad pixel detection and correction, as described below with reference to FIGS. 5A–B. The signal processing unit 200 treats the bad pixels as random 'shot noise' and utilizes non-linear conditional filtering for detecting and eliminating or excluding the noisy or defective pixels.

The imaging system of the present invention, such as the monochrome system 198 in FIG. 4, employs an on-the-fly bad pixel detection and correction process that is a signal processing procedure performed during the sensor readout stage. The system 198 of FIG. 4 may perform a random access readout of the pixels using the column and row decoders 212, 214. In on-the-fly bad pixel detection and correction, the signal processing unit 200 illustrated in FIG. 4 performs bad pixel detection step via horizontal, vertical and diagonal conditional median filters within the signal processing unit 200. If a middle or center pixel is not within the condition limits, it is replaced in the correction step by a value determined by the directional median that possesses the minimum variation, as described below. The value chosen can be either the median or an average.

Figure 5B:
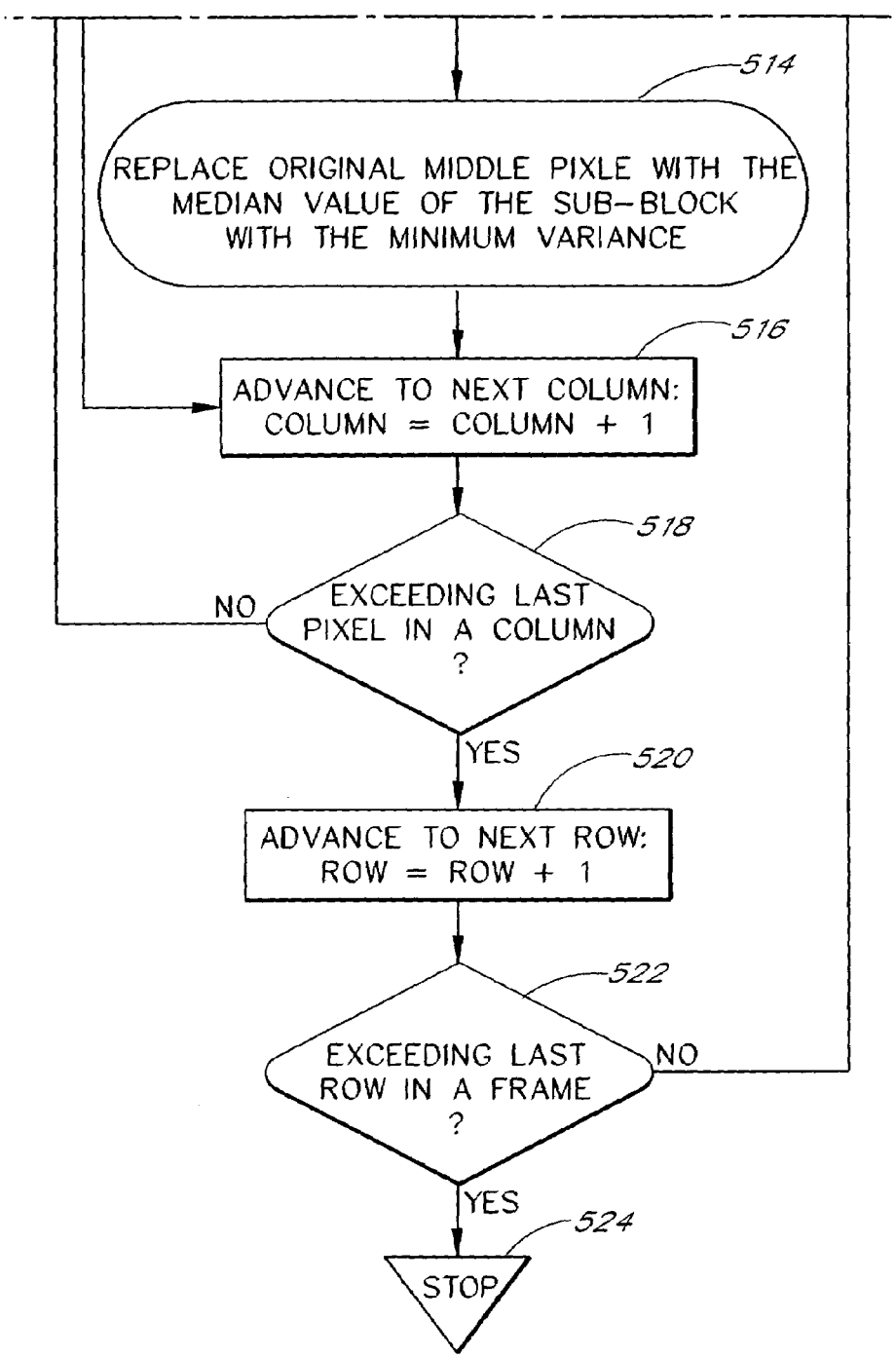

FIGS. 5A–B illustrate one embodiment of an on-the-fly bad pixel detection and correction process in full resolution mode implemented by the circuit of FIG. 4. The present invention advantageously permits bad or defective pixels to be detected even after the imaging device has been provided to an end-user, such as a consumer, in a camera or the like. Thus, for example, the present invention allows bad pixel detection to be performed on-the-fly, in response to an end-user capturing an image using the camera, or during a calibration procedure automatically initiated when the user turns on the camera.

Figure 6:
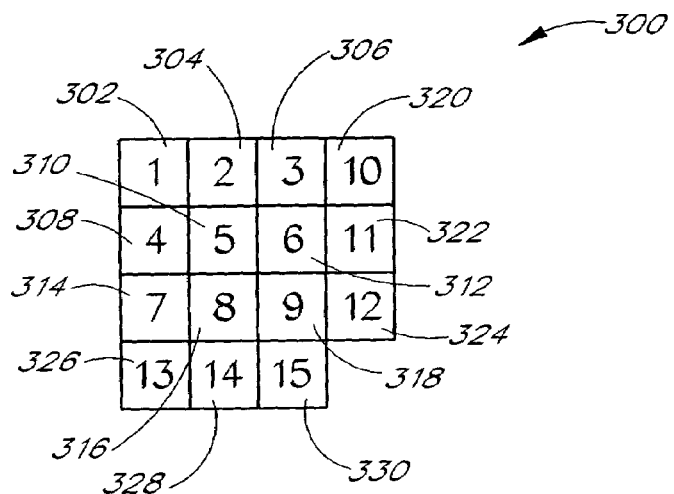
FIG. 6 illustrates an exemplifying 3×3 block of pixels within the system of FIG. 4.

FIG. 6 illustrates an exemplifying 3×3 block of pixels within the system of FIG. 4. In FIG. 6, the block 300 comprises a first pixel 302, a second pixel 304, a third pixel 306, a fourth pixel 308, a fifth pixel 310, a sixth pixel 312, seventh pixel 314, an eighth pixel 316, and a ninth pixel 318 FIG. 6 also shows a portion of a next column in the array of FIG. 4. The next column comprises a tenth, eleventh and twelfth pixels 320, 322, 324. FIG. 6 also shows a portion of the next row in the array of FIG. 4. The next row comprises a thirteen, fourteenth and fifteenth pixels 326, 328, 330.

The process illustrated in FIGS. 5A–B is described with reference to FIGS. 4 and 6. In a start state 502 of FIG. 5A, the column and row readout circuits 212, 214 illustrated in FIG. 4A read out a 3×3 pixel block or neighborhood 300, such as that illustrated in FIG. 6, of pixel sensor element values. The pixel values may be those for an image taken by an end-user using an imaging system, such as those illustrated in FIGS. 1 and 2. In a process state 504, the pixel address generator 216 illustrated in FIG. 4 prepares four 1×3 sub-blocks comprised of pixels in a line: a middle horizontal sub-block, a middle vertical sub-block, and a first and second middle diagonal sub-blocks. The 1×3 sub-blocks may also be referred to as groups, local neighborhoods or subsets. The 1×3 middle horizontal sub-block comprises the fourth, fifth and sixth pixels 308, 310, 312. The middle vertical sub-block comprises the second, fifth and eighth pixels 304, 310, 316. The first middle diagonal sub-block comprises the first, fifth and ninth pixels 302, 310, 318. The second middle diagonal pixel sub-block comprises the third, fifth and seventh pixels 306, 310, 314.

In a process state 506, the bad pixel detection and correction unit 200 calculates the distribution for each 1×3 sub-block, i.e., the absolute difference between the highest and the lowest pixel sensor element values in a 1×3 sub-block. In a process state 508, the bad pixel detection and correction unit 200 finds the 1×3 sub-block with the minimum variance, i.e., the block with smallest absolute difference. In a process state 510, the bad pixel detection and correction unit 200 determines the median value for each 1×3 sub-block by sorting the three pixel values in each 1×3 sub-block from lowest to highest. For example, if a 1×3 block has values of 10, 15 and 100, the median value would be 15.

In a decision block 512, the bad pixel detection and correction unit 200 determines whether the value of the original middle pixel 310 illustrated in FIG. 6 exceeds the median values of the four 1×3 sub-blocks. If the original middle pixel 310 value exceeds the median values of the four 1×3 sub-blocks, then in a process state 514, the bad pixel detection and correction unit 200 replaces the original middle pixel 310 value with the median value of the 1×3 sub-block with the minimum or smallest variance found in process state 508. Effectively, the bad pixel detection and correction unit 200 picks the smoothest edge. The bad pixel detection and correction unit 200 then passes the replaced middle pixel value via pixel data output line 201 for further processing, as is performed on the other pixels. In a process state 516, the pixel address generator 216 and the bad pixel detection and correction unit 200, illustrated in FIG. 4, advance to the next column, such that the middle pixel is now the sixth pixel 312 illustrated in FIG. 6.

If the unit 200 determines that the original middle pixel 310 value does not exceed the median values of the four 1×3 sub-blocks, then in process state 516, the pixel address generator 216 and bad pixel detection and correction unit 200 advance to the next column, such that the middle pixel is now the sixth pixel 312 in FIG. 6. In a decision block 366, the pixel address generator 216 determines whether it has exceeded the last column in the pixel array of FIG. 4. If the pixel address generator 216 has not exceeded the last column in the pixel array, the generator 216 and the bad pixel detection and correction unit 200 begin to process the next 3×3 block.

If the pixel address generator 216 has exceeded the last column in the pixel array of FIG. 4, then in a process state 520, the generator 216 advances to the next row of pixel sensor elements, such that the middle pixel is now the eighth pixel 316. In a decision state 522, the address generator 216 determines whether it has exceeded the last row in the array of FIG. 4. If the address generator 216 has not exceeded the last row in the array, the generator 216 and the bad pixel detection and correction unit 200 begin to process the next 3×3 block. If the address generator 216 has exceeded the last row in the array, the generator stops in a stop block 524.

The bad pixel detection and correction process may also be described via the following exemplary mathematical algorithm which may be implemented in software or hardware.

In this example, the pixel neighborhood used is a 3×3 group as follows:

$X_{(0,0)}$, $X_{(0,1)}$, $X_{(0,2)}$
$X_{(1,0)}$, $X_{(1,1)}$, $X_{(1,2)}$
$X_{(2,0)}$, $X_{(2,1)}$, $X_{(2,2)}$

Then, using the digitized pixel values, the median values for the four 3-pixel subsets that include the middle pixel $X_{(1,1)}$ are calculated, and the maximum and minimum median values are assigned correspondingly to the variables Max and Min as follows:

(1) Max =

Maximum[Median($X_{(1,0)}$, $X_{(1,1)}$, $X_{(1,2)}$), Median($X_{(0,1)}$, $X_{(1,1)}$, $X_{(2,1)}$), Median($X_{(0,0)}$, $X_{(1,1)}$, $X_{(2,2)}$), Median($X_{(0,2)}$, $X_{(1,1)}$, $X_{(2,0)}$)]

(2) Min = Minimum[Median($X_{(1,0)}$, $X_{(1,1)}$, $X_{(1,2)}$), Median($X_{(0,1)}$, $X_{(1,1)}$, $X_{(2,1)}$), Median($X_{(0,0)}$, $X_{(1,1)}$, $X_{(2,2)}$), Median($X_{(0,2)}$, $X_{(1,1)}$, $X_{(2,0)}$)]

(3) The ratios of the middle pixel value to the Max value and to the Min value are compared to a threshold value. The threshold value is a predetermined value so chosen that if the above ratios are greater than the threshold, there is a statistically high likelihood that the middle pixel value is in error.

$$\text{Limit} = \left(\frac{X_{(1,1)}}{\text{Max}} \geq \text{Threshold}\right) \text{ or } \left(\frac{\text{Min}}{X_{(1,1)}} \geq \text{Threshold}\right)$$

(4) If (Limit>0) then the value of the middle pixel will be replaced with the median value of one of the four 3-pixel subsets. The median value of the subset with the smallest variance between the values of the most physically distant pixels within the subset will be used to replace the middle pixel value, as follows:

(5) Variance=Minimum ($|X_{(1,0)}-X_{(1,2)}|$, $|X_{(0,1)}-X_{(2,1)}|$, $|X_{(0,0)}-X_{(2,2)}|$, $|X_{(0,2)}-X_{(2,0)}|$)

(6) If Variance∈{$X_{(1,0)}$, $X_{(1,1)}$, $X_{(1,2)}$} Then (7) $X_{(1,1)}$=Median($X_{(1,0)}$, $X_{(1,1)}$, $X_{(1,2)}$)

(8) If Variance∈{$X_{(0,1)}$, $X_{(1,1)}$, $X_{(2,1)}$} Then (9) $X_{(1,1)}$=Median($X_{(0,1)}$, $X_{(1,1)}$, $X_{(2,1)}$)

(10) If Variance∈{$X_{(0,0)}$, $X_{(1,1)}$, $X_{(2,0)}$} Then

(11) $X_{(1,1)}$=Median($X_{(0,0)}$, $X_{(1,1)}$, $X_{(2,2)}$)

(12) If Variance∈{$X_{(0,2)}$, $X_{(1,1)}$, $X_{(2,0)}$} Then

(13) $X_{(1,1)}$=Median ($X_{(0,2)}$, $X_{(1,1)}$, $X_{(2,0)}$)

Figure 9:
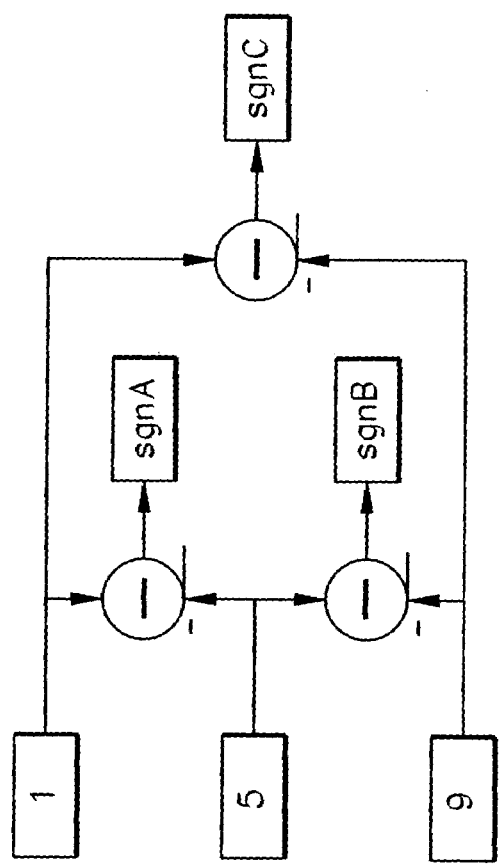
FIG. 9 illustrates an exemplifying circuit used to locate a minimum pixel value, an intermediate pixel value, and a maximum pixel value in a group of three pixels.

FIG. 9 illustrates an exemplifying circuit used to locate a minimum pixel value, an intermediate pixel value, and a maximum pixel value in a group of three pixels, such as one of the groups used in the above equations. This circuit may be implemented in a gate array, a field programmable gate array, a custom integrated circuit, using discrete logic, or in software. Optionally, the illustrated circuit may be repeated four times so that the pixels having the minimum, maximum, and intermediate value for each of the pixel groups ($X_{(1,0)}$, $X_{(1,1)}$, $X_{(1,2)}$), ($X_{(0,1)}$, $X_{(1,1)}$, $X_{(2,1)}$), ($X_{(0,0)}$, $X_{(1,1)}$, $X_{(2,2)}$), ($X_{(0,2)}$, $X_{(1,1)}$, $X_{(2,0)}$) may be located in parallel, thereby speeding the process. In another embodiment, to reduce circuitry, the location process may be serially performed using only one circuit.

In the illustrated example, pixel 1 corresponds to $X_{(1,0)}$, pixel 5 corresponds to $X_{(1,1)}$, and pixel 9 corresponds to $X_{(1,2)}$. The corresponding signs sgnA, sgnB, sgnC, of the values of (pixel 1–pixel 5), (pixel 5–pixel 9), and (pixel 1–pixel 9) are calculated. The signs of the results are used to address a look-up table. A positive sign is a "0" and a negative sign is a "1" for purposes of addressing. The lookup table maps the sign values into an identification of the pixel having the minimum value, the pixel having the maximum value, and the pixel having the minimum value. Thus, for example, if pixel 1 has a normalized value of 0.9, pixel 5 has a normalized value of 0.7, and pixel 9 has a normalized value of 0.8, then sgnA is positive, or a "0"
sgnB is negative, or a "1"
sgnC is positive, or a "0"

Thus, the address is a 010. The location information at the location addressed by 010 identifies pixel 5 as having the minimum value, pixel value having a middle or intermediate value, and pixel 1 as having a maximum value. This location information may be then be used in calculating the distribution for each 1×3 sub-block, such as the difference between the highest and the lowest pixel element sensor value calculated at process state 506 in FIG. 5. A similar circuit may be used to locate the highest, intermediate, and lowest median value from a group of median values, as performed in Equations 1 and 2 above.

It is important to note that the present invention is not limited to the embodiments discussed above. Other configurations may be implemented in accordance with the present invention. For example, in one embodiment, instead of or in addition to using straight 1×3 diagonal pixel sub-blocks, the address generator 216 and bad pixel detection and correction unit 200 may use a semi-diagonal 1×3 sub-block, such as the third, fifth and eighth pixels 306, 310, 316 of the block illustrated in FIG. 6. In another embodiment, the address generator 216 may use a semi-diagonal 1×3 sub-block, such as the third, fifth and ninth pixels 306, 310, 318.

In still another embodiment, instead of or in addition to using the various 1×3 pixel sub-blocks discussed above, the address generator 216 and the bad pixel detection and correction unit 200 may use the complete 3×3 pixel neighborhood for one median filtering of the 9 elements. In still another exemplary embodiment, the mean values for all the blocks in the neighborhood are utilized, rather than median values.

In other embodiments, the bad pixel correction does not rely on minimum variance. For example, any of the median values can be chosen arbitrarily as the bad pixel replacement. Further, other values, such as the average values of some or all of the pixels in a block or group may be used.

In another embodiment, the address generator 216 and bad pixel detection and correction unit 200 may be configured to use other sizes of blocks or groups of pixels. For example, a 5×5 pixel block instead of a 3×3 block may be used, such that each median is selected from a 1×5 pixel sub-block instead of a 1×3 sub-block. In one embodiment, the pixel to be examined may be included in each 1×5 pixel sub-block. Rather than examining or testing the value of a center pixel within the 1×5 pixel sub-block, other pixels, such as other interior pixels having a pixels from the block positioned on two sides, may be used. Other embodiments may detect and correct pixel values using the values of pixels in a two dimensional neighborhood having other geometric shapes, such as circular or triangularly shaped neighborhoods, or using neighborhoods having irregular shapes. In still another embodiment, rather than using only pixels within a neighborhood in detecting and correcting pixel failures or misreadings for pixels within the neighborhood, all array pixels may be used, with more weight being given to those pixels proximate to a pixel whose value is being inspected and/or corrected.

Figure 7:
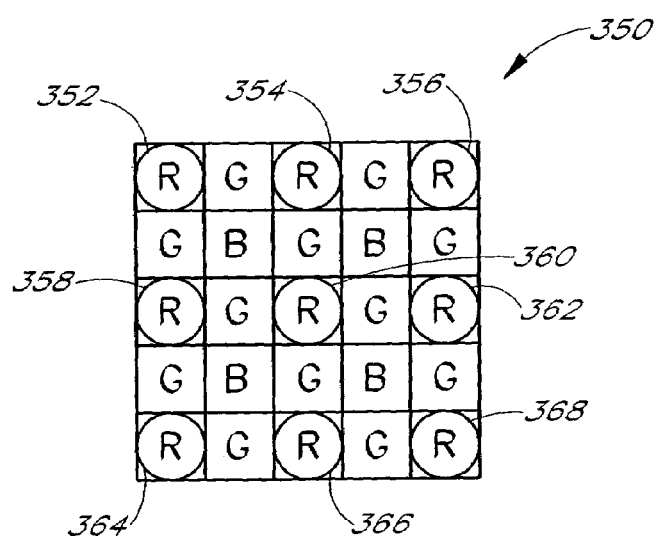
FIG. 7 illustrates an exemplifying 5×5 block of pixels using the primary color scheme and the Bayer color pattern where the middle pixel is red.

Furthermore, for color imaging systems, a block with color filter components may be used. For example, a color imaging system with an RGB Bayer pattern may use a 5×5 pixel neighborhood out of which only pixels of the same color component as the middle pixel are used for the filtering process. FIG. 7 illustrates an exemplifying 5×5 sub-block of pixels using the primary color scheme and the Bayer color pattern where the middle pixel 360 is red. In FIG. 7, the pixel address generator 216 and the bad pixel detection and correction unit 200 applies the same general process shown in FIGS. 5A–B, except that only the red pixel values 352–368 are used in the 1×5 pixel sub-blocks.

Figure 8:
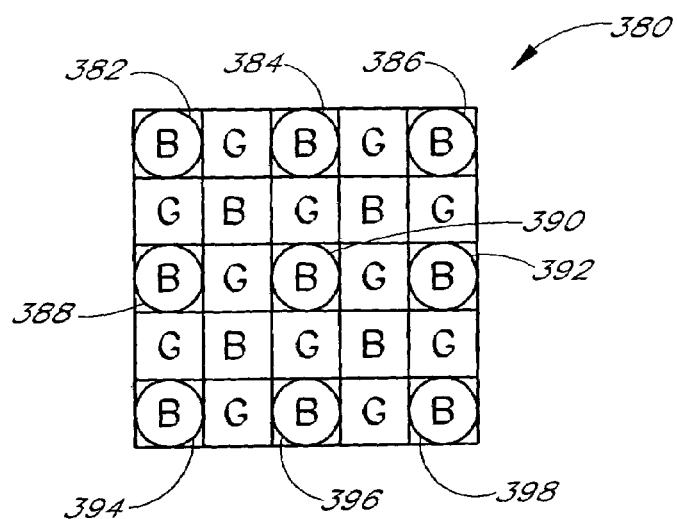
FIG. 8 illustrates an exemplifying 5×5 block of pixels using the primary color scheme and the Bayer color pattern, where the middle pixel is blue.

FIG. 8 illustrates an exemplifying 5×5 block of pixels using the primary color scheme and the Bayer color pattern, where the middle pixel 390 is blue. In FIG. 8, the pixel address generator 216 and the bad pixel detection and correction unit 200 applies the same general process shown in FIGS. 5A–B, except that only the blue pixel values 382–398 are used in the 1×5 pixel sub-blocks.

In one embodiment, the imaging system of the present invention uses random access readout. In other embodiments, the imaging system uses different implementations such as a pipeline architecture or a parallel readout architecture. A pipeline architecture may use a sequential readout via row and column shift registers and several line storage units, such as random access memory (RAM) in digital domain or capacitors in analog domain. This implementation may reduce the complexity of control circuitry, but may require additional memory or storage elements as compared to the embodiment illustrated in FIG. 4. For example, referring to FIG. 4, a RAM or 3 pixel register delay circuit may be inserted before the bad pixel detection and correction unit 200. The column address decoder may optionally be replaced with a simpler column shift register clocked by the line sync signal. Similarly, the row address decoder may optionally be replaced with a row shift register clocked by a frame sync signal. In a parallel readout architecture, several pixels per column can be read simultaneously via independent column buses and stored in registers.

In other embodiments, the imaging system further combines the on-the-fly bad pixel detection & correction with various readout modes such as windowing and sub-sampling. In one embodiment, the imaging system uses additional signal processing such as on-the-fly color interpolation.

As previously discusses, the pixels of the imaging system are not required to be organized in a rectangular matrix. A similar implementation can provide on-the-fly bad pixel correction and detection for a color imaging system and/or a different pixel topography via modification to the readout control, the pixel neighborhood size and configuration.

Thus, as described above, the various embodiments of the present invention advantageously provides an on-line, on the fly defective pixel detection and correction process that provides high speed operation, reduced storage requirements, and improved detection of defective pixels as compared to conventional systems.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. An imaging system configured to compensate for one or more individual defective pixels in an array of pixel elements, the system comprising:
   an array of pixel sensor elements;
   a readout controller coupled to the array, the readout controller configured to read a block of pixels within the array, the block including a center pixel, the controller further configured to generate pixel addresses of at least three subsets of pixels within the block; and
   a bad pixel detection and correction unit configured to determine a subset with a minimum variance, calculate a median of each subset, determine whether a value of the center pixel exceeds the medians of the subsets, and to replace the value of the center pixel with the median of the subset with the minimum variance if the value of the center pixel exceeds the medians of the subsets.

2. The imaging system as defined in claim 1, wherein the array comprises a monochrome array.

3. The imaging system as defined in claim 1, wherein the system further comprises a color filter deposited on the array.

4. The imaging system as defined in claim 1, wherein the subsets comprise a horizontal row and two diagonal patterns.

5. The imaging system as defined in claim 1, wherein the subsets comprise a vertical row and two diagonal patterns.

6. A method of correcting one or more individual defective pixels in an array of pixel elements, the method comprising:
   reading a pixel block of an array of pixel sensor elements, the pixel block including an interior pixel;
   selecting at least a first subset, a second subset and a third subset of pixels within the pixel block, the first subset comprising pixels arranges in a first diagonal pattern within the block, the second subset arranged in a second diagonal pattern within the block, the third subset arranged in a non-diagonal pattern;
   calculating a variance between a highest and a lowest pixel sensor value within each subset;
   identifying a subset with the least variance;
   calculating a first value based on at least one of a median, average, and mean pixel sensor value for the corresponding three subsets;
   determining whether a value for the interior pixel varies from the first value by more than a first amount; and
   replacing the value for the interior pixel with a replacement value based on the pixel sensor values of the subset with the lowest variance if the value for the interior pixel varies from the first value by more than a first amount.

7. The method of claim 6, further comprising:
   selecting a fourth subset arranged in another non-diagonal pattern; and
   calculating a variance between a highest and a lowest pixel sensor value within the fourth subset.

8. The method of claim 6, wherein the non-diagonal pattern is horizontal.

9. The method of claim 6, wherein the non-diagonal pattern is vertical.

10. The method of claim 6, wherein the act of reading a pixel block comprises reading a 3×3 pixel block.

11. The method of claim 6, wherein the act of reading a pixel block comprises reading a 5×5 pixel block.

12. A method of detecting and compensating a defective pixel element within an array of pixel elements in an imaging device while the imaging device is in use by an end-user, the method comprising:
capturing an image taken by the end-user using the imaging device; for the captured image,
selecting a first pixel element for determination that said pixel element is defective,
identifying an associated set of pixel elements of said array of pixel elements in which said first pixel element is member,
partitioning said associated set of pixel elements of said array into a plurality of subsets of the associated set such that said first pixel element is centrally included,
determining an arithmetic central value for each of the plurality of subsets of the associated set;
comparing a value of said first pixel element with a second value related to said arithmetic central value for each of the plurality of subsets of the associated set;
determining from the comparison if the value of the first pixel element is in error; and
substituting a third value related to the value of at least one of the other pixels elements at least partly in response to determining the value of the first pixel element is in error.

13. The method as defined in claim 12, wherein the comparison act includes comparing the value of the first pixel element with the median value of each of the plurality of subsets of the associated set.

14. The method as defined in claim 12, wherein the plurality of subsets of the associated set include at least two pixel elements adjacent to the first pixel element.

15. The method as defined in claim 12, wherein the second value is also related to the value of the first pixel element.

16. The method as defined in claim 12, wherein the third value is related to the median value of at least two other pixel values.

17. The method as defined in claim 12, wherein the imaging device is a color imaging device, and the pixel elements of the plurality of subsets of the associated set whose values are compared to the first pixel value are intended to sense the same color as the first pixel element.

18. The method as defined in claim 12, wherein the imaging device is a monochrome imaging device.

19. An imaging system configured to compensate for one or more individual defective pixels in an imaging array, the system comprising:
a readout controller coupled to the imaging array, the readout controller configured to read a group of pixels within the array;
a defective pixel detection circuit configured:
to select a first pixel element for determination that said pixel element is defective,
to identify an associated set of pixel elements of said array of pixel elements in which said first pixel element is member,
to partition said associated set of pixel elements of said array into a plurality of subsets of the associated set such that said first pixel element is centrally included,
to determine an arithmetic central value for each of the plurality of subsets of the associated set,
to compare a value of said first pixel element with a second value related to said arithmetic central value for each of the plurality of subsets of the associated set at least element values of other imaging pixel elements in a first group, and
to determine from the comparison if the value of the first pixel element is in error; and
a pixel compensation circuit configured to replace the value of the first pixel with a third value related to at least one other pixel within the group of pixels when the first pixel value varies by more than the first amount from the second value.

20. The imaging system as defined in claim 19, wherein the second value is a median value of each of the plurality of subsets of the associated set.

21. The imaging system as defined in claim 19, wherein the second value is an average value of each of the plurality of subsets of the associated set.

22. The imaging system as defined in claim 19, wherein the third value is related to the median value of each of the plurality of subsets of the associated set.

23. The imaging system as defined in claim 19, further comprising a color filter overlaying at least a portion of the array.

24. The imaging system as defined in claim 19, wherein the array is a CMOS array.

25. The imaging system as defined in claim 19, wherein the array is a CCD array.

26. A camera system, comprising:
an imager, including a plurality of pixels;
a lens overlaying at least a portion of the imager;
a readout circuit coupled to the imager, the readout circuit configured to read imager pixel values;
a defective pixel detection circuit configured:
to select a first pixel element for determination that said pixel element is defective,
to identify an associated set of pixel elements of said array of pixel elements in which said first pixel element is member,
to partition said associated set of pixel elements of said array into a plurality of subsets of the associated set such that said first pixel element is centrally included,
to determine an arithmetic central value for each of the plurality of subsets of the associated set,
to compare a value of said first pixel element with a second value related to said arithmetic central value for each of the plurality of subsets of the associated set at least element values of other imaging pixel elements in a first group, and
to determine from the comparison if the value of the first pixel element is in error; and
a pixel compensation circuit configured to substitute the value of the first pixel with a value related to at least one other pixel value readout by the readout circuit; and
a power supply used to power the readout controller, the defective pixel detection circuit, and the pixel compensation circuit.

27. The camera system as defined in claim 26, wherein the camera system is a video camera.

28. The camera system as defined in claim 26, further comprising an NTSC encoder coupled to the readout circuit.

29. The camera system as defined in claim 26, wherein the camera system is located on a phone.

30. The camera system as defined in claim 26, further comprising a color filter positioned over at least a portion of the imager.

31. A method of detecting a defective pixel element within an array of pixel elements in an imaging device using an image captured by the end-user, the method comprising:

selecting a first pixel element of said image for determination that said pixel element is defective;

identifying a two dimensional neighborhood associated with said first pixel element;

partitioning said two dimensional neighborhood into a plurality of subsets of the associated set such that said first pixel element is centrally included;

determining an arithmetic central value for each of the plurality of subsets of said two dimensional neighborhood;

for the captured image, comparing a value of said first pixel element with a second value related to said arithmetic central value determined from element values of pixel elements in said two dimensional neighborhood associated with said first pixel element;

determining from the comparison if the first pixel element value is in error; and substituting the first pixel element value with a third value related to a value of at least one of the other pixels elements in the two dimensional neighborhood.

32. The method as defined in claim 31, wherein the second value is related to at least two element values corresponding to at least two pixels on opposite sides of the first pixel element.

33. The method as defined in claim 31, wherein the comparison includes determining if the first pixel element value varies from the second value by more than a threshold amount.

34. An imaging system comprising:

an imager including a plurality of pixel sensor elements;

a controller coupled to the imager, the controller configured to read pixel sensor element values;

a defective pixel detection circuit in communication with the controller and configured to identify a first pixel, identify a two dimensional neighborhood associated with said first pixel, to partition said two dimensional neighborhood, to determine an arithmetic central value for each of the plurality of subsets of said two dimensional neighborhood, and to determine when a value of a first pixel associated with a first pixel sensor element within a two dimensional neighborhood associated with said first pixel is in error by comparing the value of the first pixel to a second value related to an arithmetic central value determined from at least one other pixel element within the two dimensional neighborhood; and a pixel compensation circuit configured to replace the value of the first pixel element with a third value related to at least one other pixel element within the two dimensional neighborhood.

35. The method as defined in claim 12, wherein the arithmetic central value for each of the plurality of subsets of the associated set is the median, average, or mean of for each of the plurality of subsets of the associated set.

36. The imaging system as defined in claim 19, wherein the arithmetic central value for each of the plurality of subsets of the associated set is the median, average, or mean of for each of the plurality of subsets of the associated set.

37. The camera system as defined in claim 26, wherein the arithmetic central value for each of the plurality of subsets of the associated set is the median, average, or mean of for each of the plurality of subsets of the associated set.

38. The method as defined in claim 31, wherein the arithmetic central value for each of the element values of pixel elements in a two dimensional neighborhood associated with said first pixel element is the median, average, or mean of for each of the plurality of subsets of the associated set.

39. The imaging system as defined in claim 34, wherein the arithmetic central value for each of the at least one other pixel element within the two dimensional neighborhood is the median, average, or mean of for each of the plurality of subsets of the associated set.

* * * * *

UNITED STATES PATENT AND TRADEMARK OFFICE
CERTIFICATE OF CORRECTION

| | | |
|---|---|---|
| PATENT NO. | : 6,965,395 B1 | Page 1 of 1 |
| APPLICATION NO. | : 09/659355 | |
| DATED | : November 15, 2005 | |
| INVENTOR(S) | : Sarit Neter | |

It is certified that error appears in the above-identified patent and that said Letters Patent is hereby corrected as shown below:

Col. 1, lines 5-11
In the CLAIM OF PRIORITY delete "This patent application claims the benefit of U.S. Provisional Application No. 60/149,796 filed Aug. 19, 1999 and U.S. application Ser. Nos. 09/495,975, 09/496,364, 09/496,533, 09/496,607, filed Feb. 2, 2000 which are hereby incorporated herin by reference in their entirety."

Signed and Sealed this

Fourteenth Day of February, 2012

David J. Kappos
*Director of the United States Patent and Trademark Office*